Oct. 13, 1964 W. G. WADEY 3,152,858

FLUID ACTUATED RECORDING DEVICE

Filed Sept. 26, 1960

INVENTOR

WALTER G. WADEY

BY B. F. Griffin Jr.

ATTORNEY

United States Patent Office 3,152,858
Patented Oct. 13, 1964

3,152,858
FLUID ACTUATED RECORDING DEVICE

Walter G. Wadey, Wynnewood, Pa., assignor to Sperry Rand Corporation, New York, N.Y., a corporation of Delaware Filed Sept. 26, 1960, Ser. No. 58,306
4 Claims. (Cl. 346—75)

Figure 1:
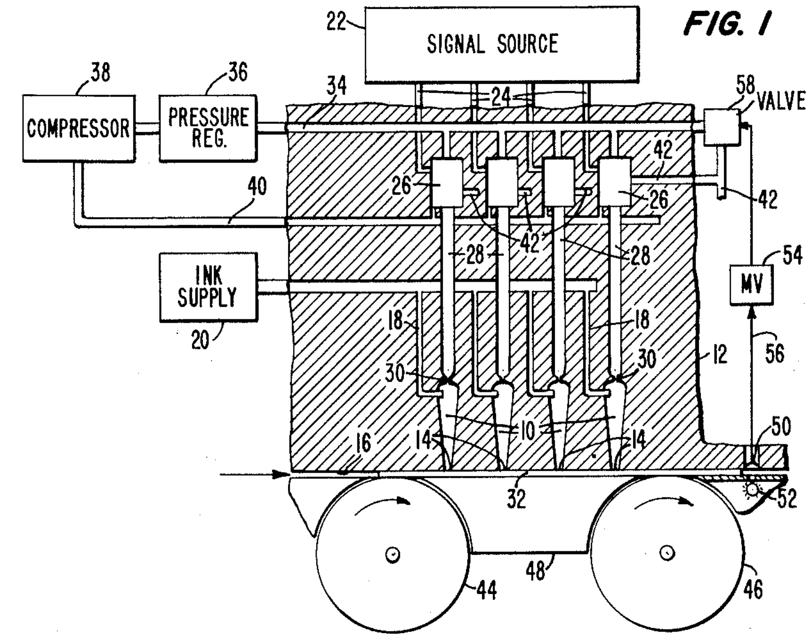

This invention relates to data recording devices of the type used in data processing systems. More particularly, the present invention relates to fluid actuated devices for applying indicia or marks to the surface of a record medium such as a card or tape.

In data processing devices of the prior art, the output data has been stored on record media as magnetized areas on magnetic tapes, holes punched in record cards or tapes, or symbols printed on a card or sheet of paper. Magnetic tapes have a disadvantage in that they cannot be visually sensed to determine the data recorded thereon. Card punches and printers of the prior art produce records which may be visually sensed but, because of the mechanical parts which are required, they must operate at relatively slow speeds and can record only a limited volume of output data within a given time interval.

Therefore, an object of the present invention is to provide recording devices for recording data as coded symbols on a record medium, said recording devices being faster in operation than the recording devices heretofore known.

An object of the present invention is to provide recording devices for recording data as coded symbols on a record medium, said recording devices having fewer moving parts than the recording devices heretofore known.

The above mentioned objects are accomplished in the present invention by providing one or more aspirators each having a port or opening adjacent the surface of the recording medium. Indicia material is supplied to the chambers of the aspirators under the control of fluid streams applied to the chambers, said fluid streams withdrawing the indicia material from the supply source and depositing it upon the surface of the record medium.

More specifically, the present invention provides a plurality of aspirator chambers, a plurality of conduits each terminating at an opening in said chambers, and means for applying fluid streams to said chambers in close proximity to said openings to withdraw indicia material from said conduits and deposit it upon a record medium.

A further object of the present invention is to provide a recording device for recording indicia on a record medium while said record medium is in motion, said indicia being of a type which may be optically, electrically or magnetically sensed.

Another object of this invention is to provide fluid operated means for recording indicia representative of coded data characters on a record medium, each of said indicia representing one element of the code in which the data characters are expressed.

In one embodiment of the present invention all elements of all coded characters are recorded simultaneously. In a second embodiment, all elements of a single coded character are recorded simultaneously with the code elements of succeeding characters being recorded after successive time intervals. In a third embodiment, like code elements of each data character are recorded simultaneously with succeeding code elements of the data characters being recorded after successive time intervals.

Figures 2, 3, 4, 5, 6:
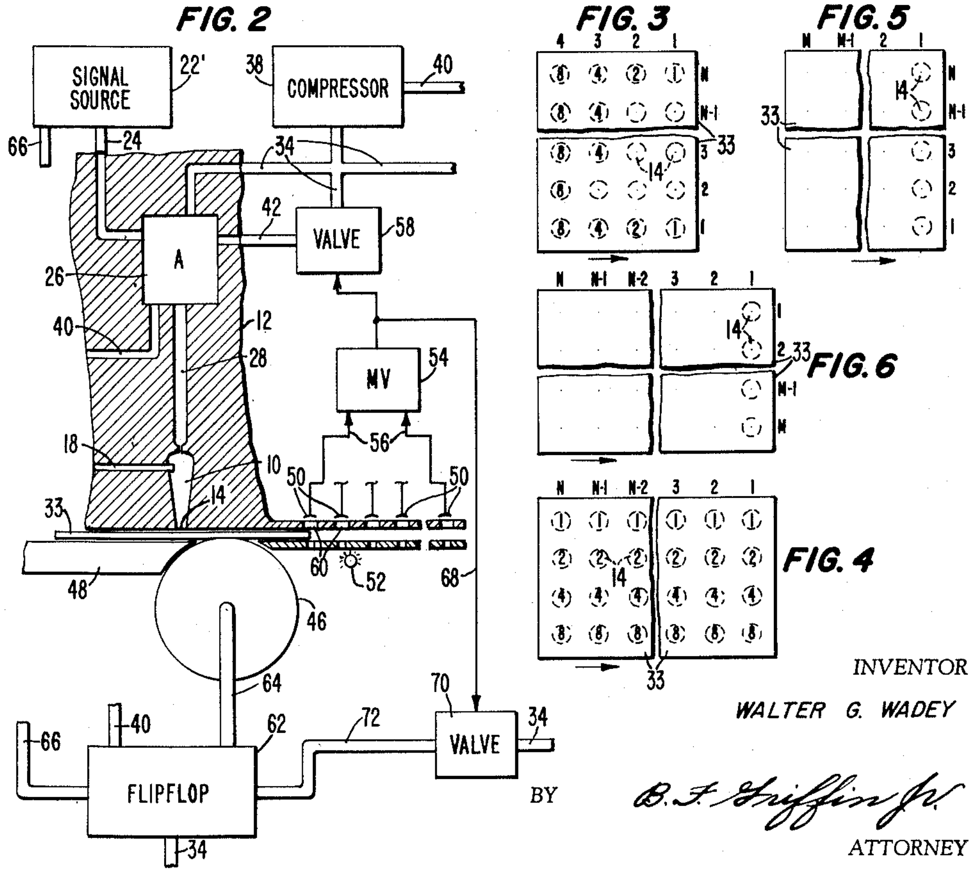

Other objects of the invention and its mode of operation will become apparent upon consideration of the following description and drawings in which:

FIGURE 1 is a view, partly in section, of a first embodiment of the present invention wherein all code elements of all data characters are recorded simultaneously;

FIGURE 2 is a view, partly in section, of a second embodiment of the present invention adaptable to either record data one character at a time or to record like code elements of all characters simultaneously with succeeding code elements being recorded after successive time intervals; and, FIGURES 3–6 illustrate different arrangements of the recording means with respect to the feed path of the record medium.

FIGURE 1 shows a first embodiment of the present invention arranged to simultaneously record all indicia on a record medium 32. A plurality of aspirator chambers 10 are formed within the body 12. Each chamber has an opening or port 14 in the surface 16 of the body 12. Indicia material is supplied to each aspirator chamber through ducts 18 which are connected to the ink supply source 20.

Signals representing data to be recorded are selectively applied from signal source 22 over ducts 24 to fluid amplifiers 26. Signal source 22 may, for example, be a device for pneumatically sensing holes punched in a record medium. Output signals from the actuated fluid amplifiers are applied over pneumatic control ducts 28 to the aspirator chambers. These output signals are in the form of increased fluid pressure signals and, because of the restricted orifices 30, cause high velocity fluid streams to pass through the aspirator chamber. In accord with Bernoulli's theorem the high velocity fluid streams reduce the pressure inside the aspirator chambers thus causing slugs of indicia material to be withdrawn from the ducts 18. The high velocity fluid streams then convey the indicia material to the record medium 32 through the ports 14.

The supply ducts 18 may be of sufficient size so that under no-signal conditions in the chambers (no high velocity fluid stream applied) the surface tension of the indicia material is sufficient to prevent the indicia material from flowing. Alternatively, the indicia materal may be applied to the ducts 18 under pressure, the pressure being controlled by a regulator to be substantially equal to the pressure within the chambers 10 when no signals are applied over ducts 28. In either arrangement, the indicia material will be drawn into the chambers when the high velocity fluid streams reduce the pressure therein.

Fluid amplifiers 26 each receive a power stream input over duct 34 from pressure regulator 36 and compressor 38. In the absence of control signals on ducts 24 the power streams are directed to the fluid return duct 40 and return to the low pressure side of the fluid supply. A signal applied to one of the amplifiers over its control duct 24 will cause the power stream to be deflected to the pneumatic control duct 28 provided a control signal is not being applied to the input duct 42. The input duct 42 is an "overriding" control signal input. That is, if a signal is applied to this input, it will deflect the power stream to the fluid return duct 40 even though a signal is being applied to the amplifier over the control input duct 24. Fluid amplifiers of this type are shown and described in copending application Serial No. 58,467, filed Sept. 26, 1960, now Patent Number 3,075,548, entitled Delay Line Memory.

The record medium 32 is moved along the feed path by continuously rotating pneumatic feed rolls 44 and 46 which may be of the type disclosed in my copending application Serial No. 49,562, filed Aug. 15, 1960, now Patent Number 3,075,679, entitled Web Feeding Device. A guide plate 48 insures that the record medium is fed close to the surface 16 in order to prevent spraying of the indicia material after it leaves ports 14. This provides a better definition of the indicia recorded on the record medium.

A photocell 50 normally receives light from a source 52. When the record medium moves into marking position it prevents the light rays from striking the photocell thus producing a signal which, after suitable amplification, is applied to the single-shot multivibrator 54 over lead 56. The multivibrator is adjusted to produce a single output signal of a given duration for each signal applied over the lead 56.

The output of the multivibrator actuates a valve 58 which is normally open to permit fluid in duct 34 to be applied to the overriding control signal inputs 42 of each of the fluid amplifiers. Valve 58 may be a solenoid controlled valve with spring bias. Many valves of this type are known in the art. Actuation of the valve by the multivibrator causes the valve to close and remove the fluid signals on ducts 42. Since indicia material can be applied to the moving record medium only during the time no signals are present on ducts 42 that the amount of indicia material applied as well as the length of the marks in the direction of movement of the record medium can be controlled by adjusting the duration of the output signal of the multivibrator.

The embodiment of FIGURE 1 operates as follows. The record medium is continuously fed from left to right by the feed rolls 44 and 46. Signals representing the data to be recorded are applied over the ducts 24 to the fluid amplifiers but produce no change in the amplifier outputs because valve 58 is open and overrides control signals are being applied to the amplifiers over ducts 42.

When the record medium reaches the marking position it blocks the light rays which normally strike the photocell 50. The photocell actuates the multivibrator 54 to momentarily close valve 58. With valve 58 closed, the overriding signals are removed from the amplifiers and they are free to switch if control signals are being applied over the ducts 24. If a control signal is being applied to one or more of the amplifiers, their power streams will be switched to the ducts 28. The signals on ducts 28 enter the chambers 10, cause withdrawal of indicia material from the ducts 18 and deposit it on the record medium.

The output signal of the multivibrator now terminates, valve 58 opens, and overriding signals are again applied to the amplifiers over ducts 42. The device is now ready to receive another set of signals from source 22. The operation is repeated each time the light rays are prevented from striking the photocell.

FIGURES 3 and 4 illustrate two ways in which the aspirator chambers of FIGURE 1 may be arranged for simultaneously applying all indicia elements of all data characters to a record card. FIGURES 3 and 4 show 4 N aspirator chamber ports 14 as they would appear looking upward through a record 33.

In FIGURE 3, the arrangement permits simultaneous recording of N data characters each expressed in the 4-element binary coded decimal notation. If the record is considered to move from left to right, four rows of ports must be provided, one for each element of the code. Each row has N ports, one port for each data character to be recorded.

Should it be desirable to feed the record endwise instead instead of lengthwise as in FIGURE 3, the arrangement of FIGURE 4 may be used. In this instance there are N rows of ports across the record path, each row containing 4 ports if the data is being recorded in the binary coded decimal notation.

FIGURE 2 illustrates a second embodiment of the present invention which requires fewer fluid amplifiers and aspirators than the embodiment of FIGURE 1. Most of the elements of FIGURE 2 operate in the same manner as corresponding elements of FIGURE 1 and have been given corresponding reference numerals.

A single row of aspirators is disposed across the feed path of the record. If the record is fed lengthwise as in FIGURE 5, N aspirators are disposed across the feed path where N is the number of data characters to be recorded. On the other hand, if the record is fed endwise as in FIGURE 6, M aspirators are disposed across the feed path where M is the number of elements in the code being used.

In either event, the ports are disposed in a single row across the feed path and the aspirators must be controlled to successively record a plurality of indicia on each record.

A plurality of photocells 50 are provided for this purpose, the photocells being connected in parallel to the input of the multivibrator so that the photocells produce successive pulses to trip the multivibrator as the record is advanced to cover successive holes 60.

FIGURE 2 also illustrates an arrangement wherein the signal source 22′ may be a typewriter thus requiring some means to produce an intermittent or start-stop motion of the record. The intermittent motion is produced by controlling flip-flop 62 which applies fluid signals to the feed roll 46 over duct 64.

Assuming that the signal source 22′ is a typewriter, the device of FIGURE 2 operates as follows. The record is fed endwise and the aspirator chambers are arranged in a single row across the record feed path in the manner shown in FIGURE 6. This permits all code elements representing a single data character to be recorded simultaneously.

Each character cycle begins by depressing a key in the signal source 22′ to produce a combination of pulses on parallel control ducts 24. These signals have no effect on the outputs of amplifiers 26 at this time because the valve 58 is open and "overriding" control signals are being applied to the amplifiers over ducts 42.

The signal source 22′ also produces a signal on fluid duct 66 each time one or more signals are produced on the ducts 24. This signal is applied to fluid flip-flop 62 to set the flip-flop and produce a pneumatic signal on duct 64. The duct 64 conveys the pneumatic signals to the feed roll 46 to move the record in the manner described in the aforementioned application entitled Web Feeding Device.

The record 33 moves to the right until it blocks the first hole 60, causing the first photocell to produce a signal to trip the multivibrator. The output signal from the multivibrator is applied to valve 58, causing it to close and remove the overriding signals on ducts 42. This permits the signals on ducts 24 to switch the power streams of selected amplifiers to the pneumatic control lines 28. As the signals pass through the aspirator chambers they withdraw slugs of indicia material from the ducts 18 and deposit them on the card in a combination which represents the character key depresesd.

The output of the multivibrator 54 is also connected by way of lead 68 to a second electrically actuated fluid valve 70. Valve 70 is normally closed and prevents the high pressure output of the compressor from being applied to duct 72. Actuation of the valve connects duct 34 with duct 72 causing a signal to be applied to the flip-flop 62. This resets the flip-flop and the signal on duct 64 ceases, thus stopping the feeding of the record. Flip-flop 62 may be of the type described in System Design, April 1960.

The output signal of the multivibrator may be passed through a suitable delay element and then applied to signal source 22′ to reset the keyboard and remove the signals on ducts 24 and 66.

The next key depressed produces another combination of signals on ducts 24 as well as a signal on duct 66. The signal on duct 66 again sets flip-flop 62 causing the record to move until it blocks the next hole 60.

It is seen therefore that each depression of a key on the keyboard of signal source 22′ causes the record medium to be stepped along the card feed path and the indicia for the corresponding data character to be recorded.

If the signal source 22′ of FIGURE 2 is a pneumatic card sensing device, then the aspirators may be arranged in a single row across the feed path in the manner shown in either FIGURE 5 or FIGURE 6, depending upon whether the record to be marked is fed endwise or lengthwise. In this case it is preferable not to have intermittent motion of the record medium so the flip-flop 62 and valve 70 may be replaced with a feed control mechanism similar to that described in my above mentioned application entitled Web Feeding Device.

The indicia material may be an ink containing magnetic or electrically conductive material so that the record may be optically, magnetically or electrically sensed. Such inks are well known in the art.

While the novel features of the invention as applied to preferred embodiments have been shown and described, it will be understood that various omissions and substitutions in the form and detail of the devices illustrated may be made by those skilled in the art without departing from the spirit of the invention.

For example, both embodiments of FIGURES 1 and 2 may utilize a means for feeding the record medium which is either intermittent or continuous in its operation so that the indicia may be applied to the card while it is stopped or while it is in motion. Alternatively, the binary, decimal, Hollerith, Baudot or other system of representation may be used in combination with continuous or intermittent movement of the record medium without departing from the spirit and scope of the present invention. Furthermore, the aspirator chambers and ports may be disposed on both sides of the feed path of the record medium so that indicia may be recorded on both sides of the record medium in a single pass through the marking device. It is intended therefore to be limited only by the scope of the appended claims.

I claim:

1. A recording device for recording indicia on a record medium, said recording device comprising: means for feeding said record medium along a path; first aspirator means disposed on one side of said record path; second aspirator means disposed on the opposite side of said record path; means for supplying indicia material to said first and second aspirator means; and means for applying fluid signals to said first and second aspirator means for exhausting said indicia material onto said record medium.

2. In a data recording device for recording indicia on a record medium, the combination comprising: a fluid amplifier; an aspirator having a port adjacent said record medium; a source of indicia material; means terminating at a port in said aspirator for conveying indicia material from said source to said aspirator; means connecting an output of said fluid amplifier to said aspirator; and means for selectively applying signals to said fluid amplifier.

3. In a data recording device for recording indicia on a record medium, the combination comprising: an aspirator having an opening adjacent said record medium; means terminating at a port in said aspirator for supplying indicia material thereto; a source of data signals; and fluid amplifier means responsive to said data signals and connected to said aspirator for applying a high velocity fluid stream against said record medium whereby indicia material is withdrawn from said supply port by said high velocity fluid stream and deposited on said record medium.

4. In a digital data recording system wherein data is recorded as indicia upon the surface of a record medium, the improvement comprising: means defining an aspirator chamber having an opening adjacent said record medium; means terminating at a port in said chamber for supplying indicia material to said chamber; and means responsive to signals representing said digital data for selectively applying a high velocity fluid stream to said chamber to reduce the pressure in said chamber and withdraw indicia material from said port into said fluid stream, said indicia material so withdrawn being carried through said opening by said fluid stream and deposited on said record medium.

References Cited in the file of this patent

UNITED STATES PATENTS

| | | |
|---|---|---|
| 1,770,493 | Ranger | July 15, 1930 |
| 2,577,894 | Jacob | Dec. 11, 1951 |
| 2,776,182 | Gunderson | Jan. 1, 1957 |
| 2,925,312 | Hollmann | Feb. 16, 1960 |
| 2,942,791 | Bush et al. | June 28, 1960 |
| 3,001,539 | Hurvitz | Sept. 26, 1961 |